United States Patent
Mohan et al.

(10) Patent No.: US 9,904,511 B2
(45) Date of Patent: Feb. 27, 2018

(54) HIGH PERFORMANCE SHIFTER CIRCUIT

(71) Applicant: Cavium, Inc., San Jose, CA (US)

(72) Inventors: Nitin Mohan, Northborough, MA (US); Ilan Pragaspathy, Menlo Park, CA (US)

(73) Assignee: Cavium, Inc., San Jose, CA (US)

( * ) Notice: Subject to any disclaimer, the term of this patent is extended or adjusted under 35 U.S.C. 154(b) by 305 days.

(21) Appl. No.: 14/616,580

(22) Filed: Feb. 6, 2015

(65) Prior Publication Data

US 2016/0139879 A1    May 19, 2016

Related U.S. Application Data (60) Provisional application No. 62/080,118, filed on Nov. 14, 2014.

(51) Int. Cl.
*G06F 5/01* (2006.01)

(52) U.S. Cl.
CPC .................. *G06F 5/015* (2013.01)

(58) Field of Classification Search
CPC .................. G06F 5/01; G06F 5/015
USPC .......................................... 708/209
See application file for complete search history.

(56) References Cited

U.S. PATENT DOCUMENTS

| | | | | |
|---|---|---|---|---|
| 3,887,799 A * | 6/1975 | Lindgren | ................ | G06F 5/015 708/209 |
| 5,262,971 A * | 11/1993 | Yamaguchi | ............. | G06F 5/015 708/209 |
| 5,822,231 A * | 10/1998 | Wong | ...................... | G06F 5/015 708/209 |
| 5,896,305 A * | 4/1999 | Bosshart | ................. | G06F 5/015 708/209 |
| 5,930,159 A * | 7/1999 | Wong | ...................... | G06F 5/015 708/209 |
| 5,991,786 A * | 11/1999 | Mahurin | ................. | G06F 5/015 708/209 |
| 6,243,728 B1 * | 6/2001 | Farooqui | ................. | G06F 5/015 708/209 |
| 6,675,181 B1 * | 1/2004 | Tovey | ....................... | G06F 5/01 708/209 |
| 2007/0088772 A1 * | 4/2007 | Nunes | ..................... | G06F 5/017 708/209 |

* cited by examiner

*Primary Examiner* — David H Malzahn
(74) *Attorney, Agent, or Firm* — Wolf, Greenfield & Sacks, P.C.

(57) ABSTRACT

An improved shifter design for high-speed data processors is described. The shifter may include a first stage, in which the input bits are shifted by increments of N bits where N>1, followed by a second stage, in which all bits are shifted by a residual amount. A pre-shift may be removed from an input to the shifter and replaced by a shift adder at the second stage to further increase the speed of the shifter.

23 Claims, 6 Drawing Sheets

HIGH PERFORMANCE SHIFTER CIRCUIT

RELATED APPLICATIONS

This Application claims priority under 35 U.S.C. § 119(e) to U.S. Provisional Application Ser. No. 62/080,118, filed Nov. 14, 2014, and entitled "HIGH PERFORMANCE SHIFTER CIRCUIT."

BACKGROUND

Technical Field

The technology relates to bit shifters for digital integrated circuits. The shifters may be used in high-speed digital processors.

Discussion of the Related Art

Bit shifters are used to shift binary bits left or right for digital computations, among other applications, and are an important element in many digital processors. There are a variety of different shifter designs that may be used to shift bits left or right for an M-bit register. For example, an 8-bit register may have a bit sequence [10110101]. A right shift by two bits in a barrel shifter would result in the bit sequence [01101101]. Shifters can be configured for parallel or serial inputs and outputs, and for bidirectional shifting (shifting bits left or right). As with any logic circuit element, shifters can add timing delays to data processing circuitry and may slow down a data processor.

SUMMARY

The inventors have discovered and appreciated that, in some cases, conventional bit shifters can add an appreciable amount of timing delay to a data processor and may be the major limiting factor in data processing speed. The inventors have conceived of a two-stage M-bit shifter that can reduce timing delays compared to conventional M-bit barrel shifters. In a first stage, the two-stage shifter may shift M bits by increments of N bits where M>N>1. N may be an integer that is divisible into M with no remainder. In a second stage, the shifter may shift the M shifted bits by a residual amount that is less than or equal to N. A pre-shift of the bits that is used in some conventional shifters at an input to the bit shifter can be removed from the input for the two-stage shifter to reduce a timing delay of the shifter associated with the pre-shift. Instead, pre-shifting can be implemented in a non-critical timing path of a decoder at the second stage of the shifter.

According to some embodiments, a digital M-bit shifter may comprise a first stage having digital buffers that are configured to shift the M bits by increments of N, where N>1, and a second stage having digital buffers that are configured to shift the M bits by an amount less than or equal to N.

In some aspects, the first stage comprises a first array of tri-state buffers. The first array of tri-state buffers may be arranged in a plurality of groups, where M tri-state buffers in each group share a common enabling input line. In some implementations, the first array of tri-state buffers may be arranged in a number of rows equaling M÷N.

According to some aspects, the second stage comprises a second array of tri-state buffers configured to receive at least M bits from the first stage. In some implementations, the second array of tri-state buffers may be arranged in at least N rows of M tri-state buffers, where tri-state buffers in each row share a common enabling input line.

In some implementations, an M-bit shifter may comprise a carry buffer array of tri-state buffers, wherein the carry buffer array is configured to provide lower bits of an input bit sequence to the second stage of the M-bit shifter. In some aspects, data inputs to the carry buffer array connect to a copy register that is configured to hold a copy of M-bits provided to the shifter. In some aspects, the carry buffer array includes at least one group of tri-state buffers having their enabling inputs connected in common with enabling inputs of a group of tri-state buffers in the first stage.

According to some aspects, an M-bit shifter may comprise a first decoder configured to receive a first shift amount and apply a first sequence of shift values to the first stage, and a second decoder configured to receive a second shift amount and apply a second sequence of shift values to the second stage. The shifter may further include a shift adder configured to add an additional bit shift to a shift amount for the second stage. In some aspects, the shift adder is connected between the second decoder and shift inputs of the second stage. In some implementations, the shift adder comprises a plurality of digital multiplexors. According to some implementations, an M-bit shifter may further comprise at least one input configured to receive a value representative of a shift direction that indicates a right-shift operation or a left-shift operation.

In some implementations, an M-bit shifter may be arranged in an integrated circuit as part of an integrated processor.

The foregoing features, aspects, and implementations of a bit shifter may be included in any suitable combination in an embodiment of a two-stage, M-bit shifter.

Also contemplated are methods for operating an M-bit shifter. According to some embodiments, a method for shifting bits in a digital processor may comprise acts of receiving, at a first stage of a shifter, M bits, shifting the M bits by increments of N bits where N>1, receiving the shifted M bits at a second stage of the shifter, and shifting the received shifted M bits by a value P, where N≥P≥0.

In some aspects, a method for shifting bits may comprise receiving a signal representative of a shift amount, receiving a signal representative of a shift direction, and inverting or taking a ones compliment of the shift amount if the shift direction indicates a left-shift.

In some implementations, a method of bit-shifting with a two-stage shifter may comprise decoding at least a first portion of the received shift amount, and applying a sequence of shift signals representative of the decoded first portion to the first stage. According to some implementations, a method may comprise decoding a second portion of the received shift amount, applying a sequence of shift signals representative of the decoded second portion to a shift adder, and applying output signals from the shift adder to the second stage.

In some aspects, a method of shifting bits in a two-stage shifter may comprise providing lower bits from a copy register to the second stage, wherein the copy register is configured to hold a copy of the M bits received at the first stage of the shifter.

The foregoing aspects and implementations of acts of shifting bits may be included in any suitable combination in an embodiment of a method for shifting bits in a two-stage bit shifter.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the embodiments may be shown exaggerated, simplified, and/or enlarged to facilitate an understanding of the embodiments. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

The features and advantages of the embodiments will become more apparent from the detailed description set forth below when taken in conjunction with the drawings.

DETAILED DESCRIPTION

Figure 1:
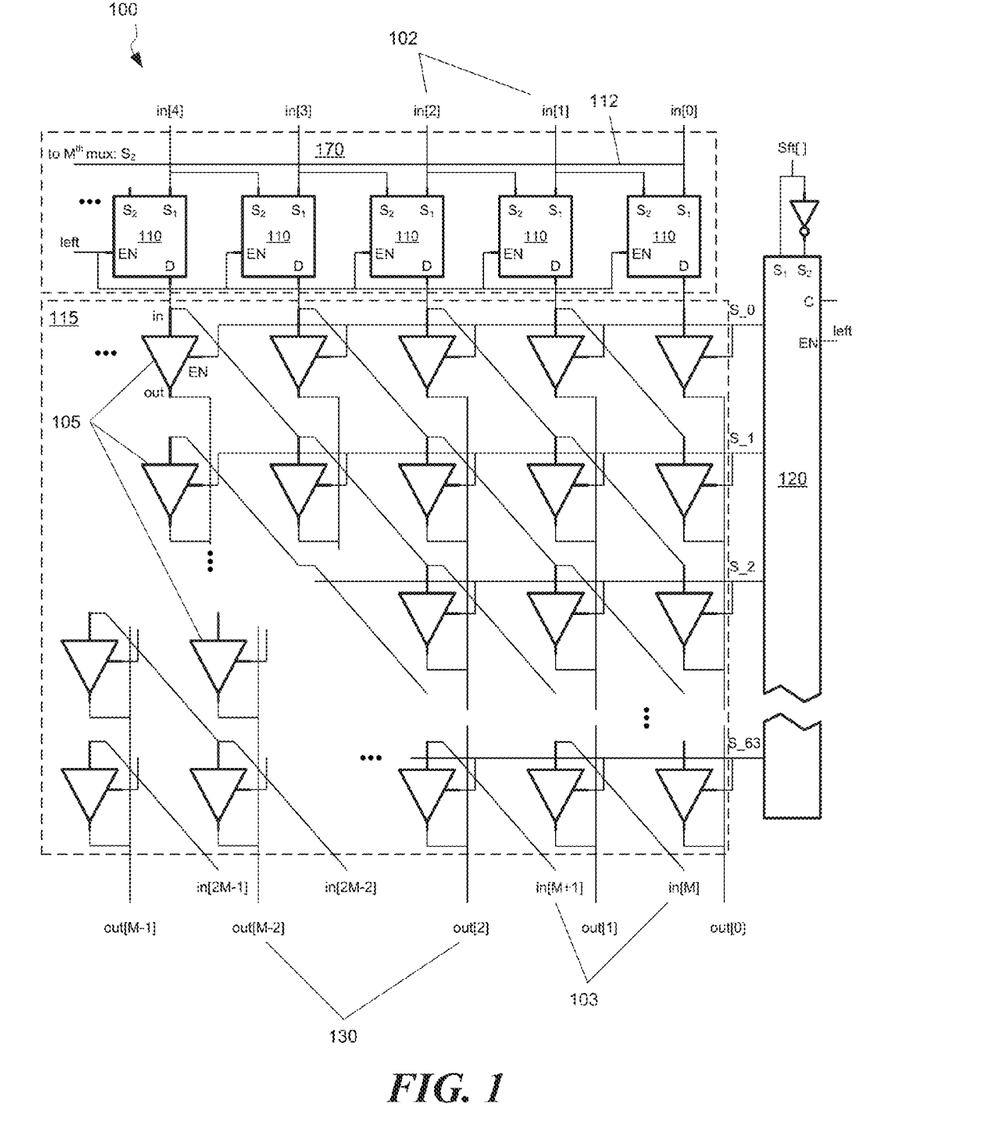
FIG. 1 is a circuit schematic representative of a barrel shifter, according to some embodiments.

Bit shifters can be a timing-critical functional block element in some modern digital processors. For example, modern 64-bit processors typically contain a bidirectional 64-bit shifter, which can perform left or right bit shifts by amounts up to 63 bits. Some bidirectional bit shifters may be implemented as a barrel shifter circuit, as depicted in FIG. 1. A barrel shifter 100 may comprise M parallel data inputs 102 (in[0], in[1], in[2], . . . in[M−1]) that are received by a pre-shift circuit 170, and M parallel data outputs 130. The pre-shift circuit 170 may comprise multiplexors 110. An additional M data inputs 103 (in[M], in[M+1], . . . in[2M−1]) may be provided from a copy register (not shown) that holds a copy of the M bits to be shifted. The M data inputs 103 may be included to move lower bits from the copy register into upper bit positions for right-shifting operations, for example.

A barrel shifter may further comprise a single-stage cross-connected digital buffer array 115, in which bits may be shifted from channel to channel by an array of cross-connected tri-state buffers 105. Each buffer 105 may have an input (in) configured to receive a bit signal (hi or low), and an output (out) that is asserted at an enable (EN) input by a control signal (e.g., a hi signal at the enable input asserts the input bit value at the buffer output). The buffer array 115 may be arranged in M columns (e.g., one column and bit channel for each input bit) and M rows (e.g., one row for each amount of bit shift). An enable (EN) signal may be selectively asserted across each row at a shift input S_0, S_1, S_2, . . . S_63 to right shift bits from channel to channel. As may be appreciated from FIG. 1 and the foregoing description, the single-stage cross-connected buffer array 115 comprises $M^2$ tri-state buffers for an M-bit shifter.

The barrel shifter 100 may further include a decoder 120 that receives a desired shift amount Sft[ ], and selectively enables a selected row of the tri-state buffers 105 according to the received shift amount. By activating the tri-state buffers selectively, higher data bits in a bit sequence may be shifted to the right to lower data bits along the diagonal cross-connects indicated in the drawing. For example, if only the top row of tri-state buffers 105 adjacent the pre-shift circuit 170 is enabled, the input bits pass through the barrel shifter without a shift. If the next row of tri-state buffers in the drawing is enabled, then the input bits are shifted to the right by one bit. A shift amount Sft[ ] (e.g., a bit sequence) may be provided to the decoder 120 as a serial bit sequence or parallel bit sequence. The decoder 120 may convert the received bit sequence (e.g., a five-bit sequence for shifts up to 63 bits) to a sequence of signals (e.g., 64 values for a 64-bit shifter) applied to shift inputs S_0, S_1, S_2, . . . S_63 at the buffer array 115.

The shifter 100 of FIG. 1 is configured to shift input bits to the right, i.e. from the direction of most significant bit to least significant bit (left to right in the drawing). In order to perform a left-shift operation, the barrel shifter shifts data to the right by an amount R[q] that results in a bit sequence that would occur for a desired left-shift amount L[p]. For example, suppose the barrel shifter is an 8-bit shifter and a left shift of 3 bits is desired. This can be implemented by shifting the bits to the right by 5 bits. More generally, the amount of right shift R[q] for a desired left shift L[p] in an M-bit shifter can be computed from the following expressions.

$$R[q]=M-L[p] \tag{1}$$

$$\overline{L[p]}=(M-1)-L[p] \tag{2}$$

In these expressions, $\overline{L[p]}$ is the bit inverse or ones complement of the desired left-shift amount, expressed as a binary sequence. Combining the expressions (1) and (2) gives the following result.

$$R[q]=\overline{L[p]}+1 \tag{3}$$

Therefore, a shifter designed for right shift operation can effectively perform a left shift by inverting the desired left-shift amount, shifting to the right by that value, and performing one extra right shift.

Some shifter designs (as shown in FIG. 1) can implement the additional right shift (+1) by pre-shifting the input data by 1-bit when a left-shift operation is required. The pre-shift circuit 170 accomplishes this task. However, the inventors have observed that this pre-shift requires routing the least significant bit (bit[0]) to the most significant bit location (bit[M−1]), for example along interconnect wire 112. For large bit shifters, such as 64-bit shifters, the extra routing can add a significant RC time delay in this timing-critical path. It may also require a larger driver at the input, resulting in both speed and power penalties.

Figure 2:
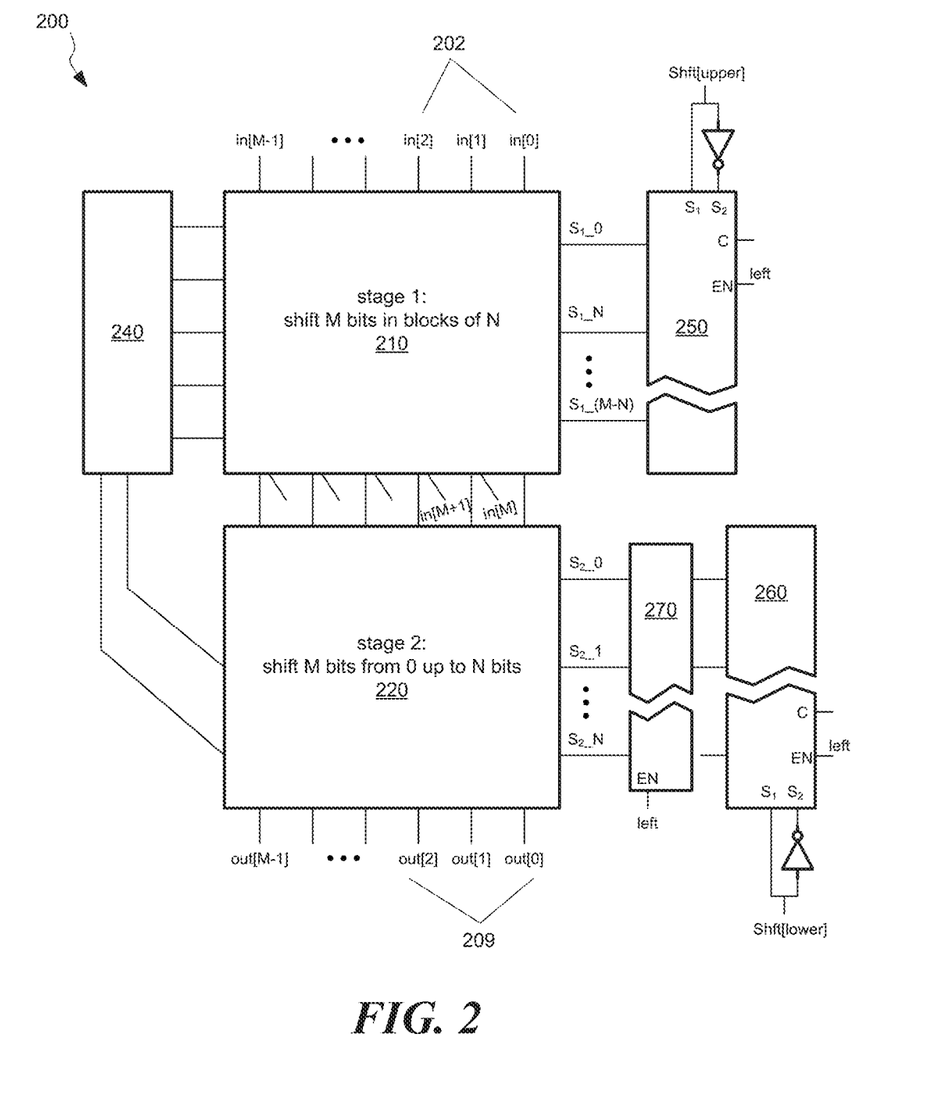
FIG. 2 depicts a two-stage, M-bit, bidirectional shifter, according to some embodiments.

The inventors have appreciated that current advances in integrated circuit manufacturing processes have resulted in transistors and logic gates of increasing speed, but that delays through metal interconnects have not improved at a similar rate to transistor speed, or have become worse due to longer interconnects across larger processors and processor components such as bit shifters. To improve shifter performance, the inventors have conceived of a two-stage, M-bit shifter 200 that is depicted in FIG. 2. The design may be implemented for 64-bit shifters, and is scalable to other bit sizes that are smaller or larger. The inventors have discovered and appreciated improvements in shifter speed by more than 50% when implementing the two-stage shifter circuit.

In overview and according to some embodiments, a two-stage shifter 200 may comprise a first stage 210 of buffers (of cross-connected, tri-state buffers, for example) and a second stage 220 of buffers (of cross-connected, tri-state buffers, for example) connected in series with the first stage. Shifted bit data output from the first stage may be received as input to the second stage. There may be M data inputs 202 to the first stage, and an additional M data inputs (e.g., in[64], in[65] . . . in[127] for a 64-bit shifter) provided from a copy register (not shown) that holds a copy of the M-bit data input to the shifter 200 at inputs 202. Shifted bits may be provided at M data outputs 209 to provide the resulting shifted bit sequence in parallel to a downstream circuit element, for example. The two-stage shifter 200 may be microfabricated as a monolithic integrated circuit (e.g., manufactured using CMOS processes).

The shifter 200 may include an a first decoder 250 that receives a shift amount Sft[upper] and selectively activates a row of tri-state buffers in the first stage 210 responsive to the received shift amount. The shifter 200 may also include a second decoder 260 that receives a shift amount Sft[lower] and a shift adder 270 that are configured to selectively activate a row of tri-state buffers in the second stage 220 responsive to the received shift amount. The shift adder may be configured to shift an output from the second decoder 260 by a value of +1 when a left shift operation is selected. The first decoder 250, second decoder 260, and shift adder 270 may all include a left-shift (left) enable input that is activated when a left-shift operation is selected.

A two-stage shifter 200 may also include a carry buffer array 240 that is configured to move copy bits (e.g., from portions of the register containing a copy of the M bits) to upper bit positions at the second stage 220 and thereby to the M-bit data outputs 209 from the shifter.

In further detail, the size of the second stage 220 may be smaller than the first stage 210 in some embodiments, or may be larger in some embodiments. For example, the second stage may have fewer or more rows of tri-state buffers than the first stage. In some embodiments, the first stage 210 of the shifter 200 may be configured to shift the M input bits by increments of N bits, where N is an integer value greater than 1. In some implementations, M>N>1, and N is divisible into M with no remainder. The second stage 220 may then be configured to shift its received M input bits by any value from 0 to N bits.

Figure 3A:
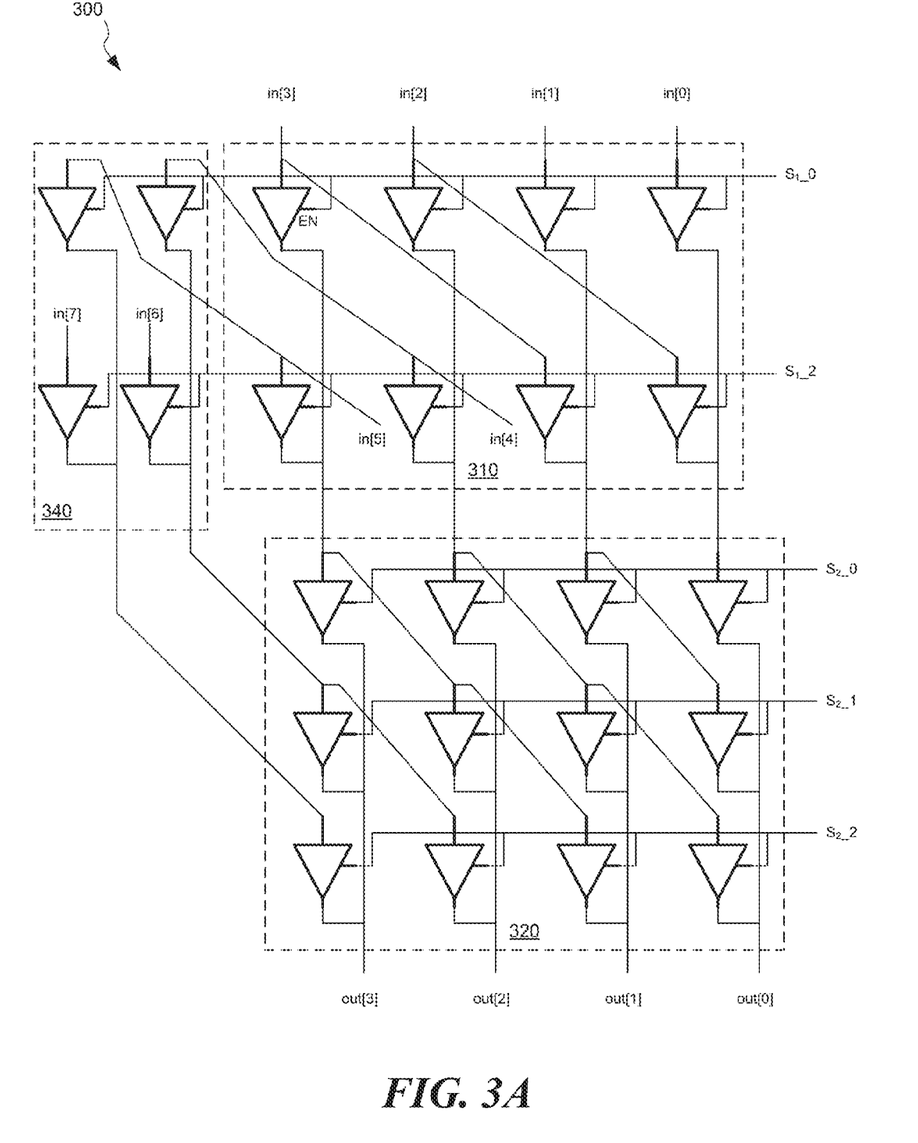
FIG. 3A depicts a circuit schematic for a portion of a two-stage, 4-bit, bidirectional shifter, according to some embodiments.

As just one example for purposes of understanding, buffer circuitry for a first stage 310, second stage 320, and carry buffer array 340 are depicted in FIG. 3A for a 4-bit shifter. In this example, N=2, and the first stage 310 of the shifter 300 comprises four data inputs (in[0], in[1], in[2], in[3]) for receiving four bits. Associated with the data inputs are four bit channels. The tri-state buffers are arranged in two rows in the first stage 310 that can be selectively activated via shift inputs $S_1\_0$, $S_1\_2$ that may receive signals from a first decoder (not shown). Accordingly, the first stage 310 may right-shift the input bits by either no bits ($S_1\_0$ activated) or two bits ($S_1\_2$ activated). In a similar manner, the second stage 320 may right-shift its received input bits by either no bits ($S_2\_0$ activated), one bit ($S_2\_1$ activated), or two bits ($S_2\_2$ activated) according to a sequence of signals received from a second decoder and shift adder (not shown). According to some embodiments, when a particular row in a stage is selected, the other rows in that stage are not enabled.

It will be apparent from FIG. 3A that any amount of right shift (up to 3 bits) for the four input bits can be obtained by selecting different combinations of rows in the first and second stages 310, 320 of the 4-bit shifter 300. Further, any amount of desired left shift L[p] (up to 3 bits) may be obtained by implementing the correct amount of right shift, as determined by EQ. 3.

Figure 3B:
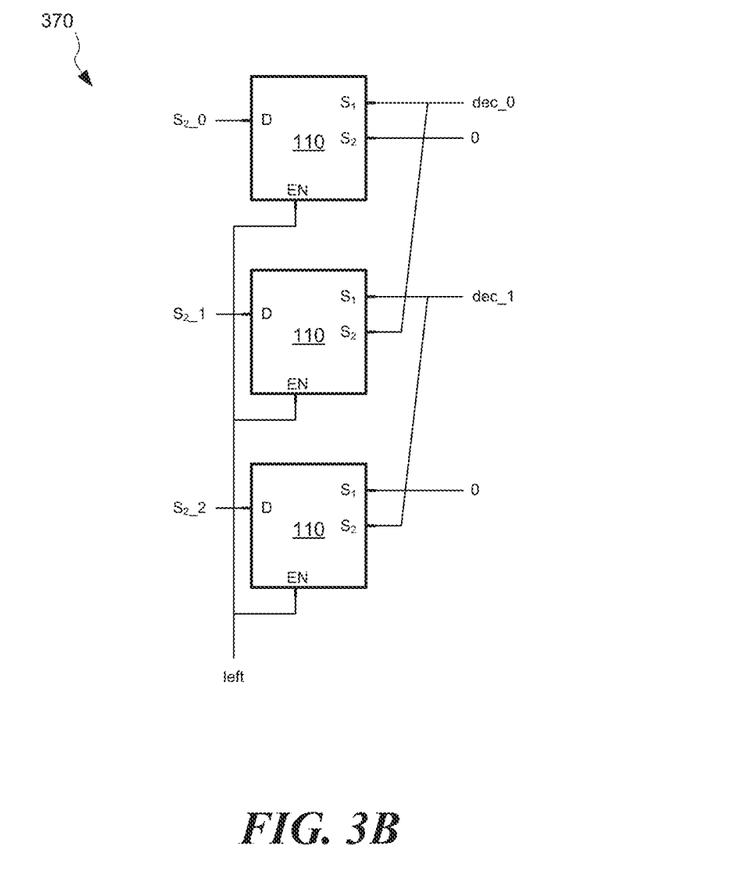
FIG. 3B depicts a pre-shift circuit, according to some embodiments.

For purposes of understanding and without limiting the invention, an example of a shift adder 370 is depicted in FIG. 3B for the 4-bit shifter. In some embodiments, the shift adder 370 is connected between the second stage 320 and a second decoder (not shown). The shift adder 370 may comprise multiplexors 110 having cross-connected data inputs $S_1$, $S_2$ as depicted, data outputs D, and enable inputs EN that are tied together and activated for a left-shift operation. The data inputs may be configured to receive shift signals dec_0, dec_1 from the second decoder, as indicated. The data outputs D may be connected to the shift inputs of the second stage 320. When a left-shift operation is selected, the values appearing at data input $S_{-2}$ may be asserted at the data outputs D. This will effectively add a shift value of +1 bit to the shift value for the second stage 320.

The circuitry shown in FIG. 3B is only one example. The shift adder may be implemented using other logic circuitry in other embodiments to achieve an added shift at the second stage of the shifter for left-shift operations.

From the example of FIG. 3A, it can be determined that for an M-bit shifter that shifts the received M bits in increments of N bits in the first stage, the number of rows in the first stage will be M÷N. The number of rows in the second stage will be N+1. For small bit shifters, a two-stage design may not be desired. However, for large bit shifters, a two-stage design can appreciably reduce the amount of circuitry needed and improve shifter speed. For example, a conventional single-stage, 64-bit shifter (as in FIG. 1) would require 64 rows of tri-state buffers, with each row containing 64 buffers. In contrast, a two-stage, 64-bit shifter (as in FIG. 4) may be configured to include 8 rows of tri-state buffers in the first stage and 9 rows of tri-state buffers in the second stage for a total of 17 rows of buffers. Each row would include 64 buffers, and the carry buffer array would add another 8 rows of 8 buffers for the depicted embodiment. Accordingly, the number of rows would be reduced from 64 to 17, and the number of buffers would be reduced from 4096 to 1152. The reduction in components reduces shifter size and power consumption, and improves shifter speed. As may be appreciated, the two-stage shifter may be incorporated in high-performance integrated processors (e.g., an integrated microprocessor, microcontroller, digital signal processor, field-programmable gate array, etc.).

Further, the removal of the pre-shift circuit 170 (referring to FIG. 1b) at the shifter input removes a time delay associated with the pre-shift circuitry, which is in a critical timing path of the shifter. The removal of the pre-shift circuitry eliminates the need to route the least significant bit (in[0]) to the most significant bit location (in[M−1]) at the input of the shifter, and eliminates a delay associated with the long interconnect that is needed for the routing (interconnect 112 in FIG. 1). In the two-stage shifter, the added shift is implemented by the shift adder 270 (referring to FIG. 2) applied to the second stage. The shift adder is in a non-critical timing path of the shifter. For example, the shift adder may execute its function while bits are being shifted in the first stage 210. The inventors have found and appreciated that the reduction in shifter size and replacement of the pre-shift circuitry with the shift adder contribute to an improvement in shifter speed by more than 50% compared to a conventional bit shifter. Such improvements in speed can allow a processor using a two-stage shifter 200 to operate at higher clock frequencies than a processor using a barrel shifter 100 like that depicted in FIG. 1.

Returning again to FIG. 2, the decoders 250, 260 are configured to receive a desired shift amount and shift direction, and output a sequence of signal values (e.g., digital hi and low level signals) to the shift inputs of the first and second stages 210, 220. The values appearing at the shift inputs may activate a row of tri-state buffers in each stage 210, 220 to obtain the desired shift of the received bits. The decoders may comprise any suitable combination of logic circuitry (e.g., any suitable combination of AND, NAND, NOR, OR, XOR gates, inverters, multiplexors, and buffers). For example, an input to each decoder may comprise a multiplexor configured to receive a shift-amount signal and its ones complement. The decoders 250, 260 may include a left-shift enable input that may be selected when a left-shift operation is desired. Asserting the left-shift enable input may select the ones complement of the received shift-amount signal. Internal logic circuitry may convert the received signals to sequences of shift-input values that are sent to the shift inputs of the first and second stages 210, 220. At the second stage 220, the output from the second decoder 260 is applied to the shift adder 270, which in turn sends its output to the second stage's shift inputs $S_2\_0, S_2\_1, \ldots S_2\_N$. For clarity, the decoders are not shown in FIG. 3A and FIG. 4.

According to some embodiments, the first decoder 250 may be configured to decode a received first shift amount Sft[upper] and output a sequence of logic values to shift inputs $S_1 \ldots 0, S_1 \ldots \_N, \ldots S_1\_(M-N)$ of the first stage 210. The second decoder 260 may be configured to decode a received second shift amount Sft[lower] and output a sequence of logic values to a shift adder 270 and shift inputs $S_2 \ldots 0, S_2 \ldots 1, \ldots S_2 \ldots \_N$ of the second stage 220 of the shifter 200. The shift adder for a two-stage, 64-bit shifter may be configured like that depicted in FIG. 3B, though additional multiplexors will be needed.

In some aspects, the first stage 210 executes a coarse shift (in increments of N bits) of the received bits. In some embodiments, the first stage 210 may shift the received bits by an amount determined from the upper bits of a received shift amount Sft[upper]. For example, in a two-stage, 64-bit shifter that is designed to shift the received bits by increments of 8 in the first state 210, the shift amount may be provided as a 6-bit binary sequence Sft[5:0]. For example a shift amount may be expressed as the bit sequence [011001]. The upper (most significant) bits Sft[5:3]=[011] may be provided to the first decoder 250 to execute the coarse shift in increments of N=8 bits, according to this example.

In some aspects, the second stage 260 of the shifter 200 may be configured to implement a residual or fine shift of the data bits. The M coarsely shifted bits from the first stage 210 may be output to the second stage's input, and shifted by an amount less than or equal to N. For the two-stage, 64-bit shifter where N=8, the amount of shift in the second stage 204 may be any value between 0 and 8, according to some embodiments. The lower (least significant) bits Sft[2:0]=[001] may be provided to the second decoder 260 to execute the fine shift, according to this example.

In some implementations, an additional bit may be provided to one or more of the first and second decoders and shift adder to indicate a shift direction (left or right).

Figure 4:
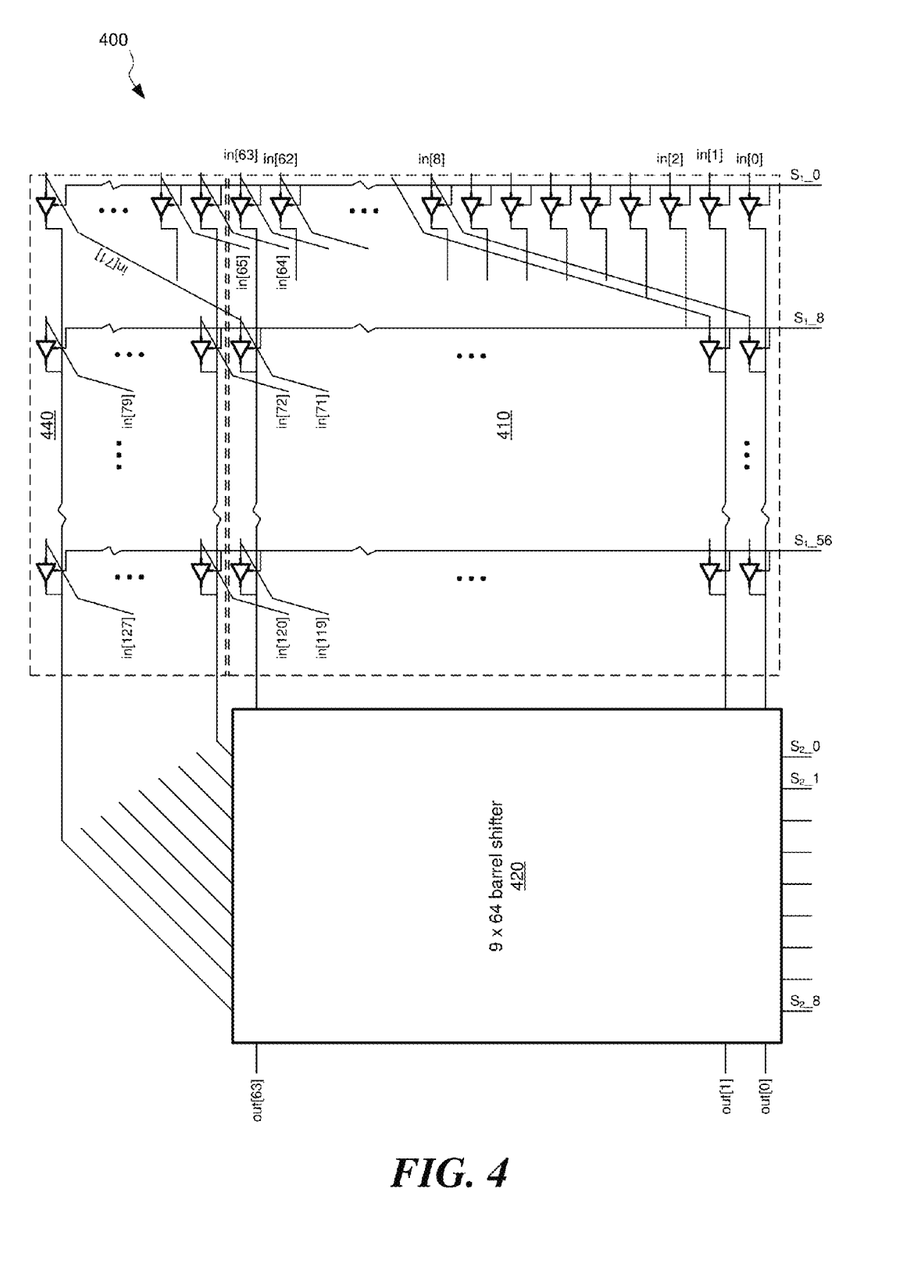
FIG. 4 depicts a circuit schematic for a portion of a two-stage, 64-bit, bidirectional shifter, according to some embodiments.

FIG. 4 depicts just one example of a two-stage, 64-bit shifter 400. For this embodiment, the first stage 410 is configured to shift the received 64 bits in increments of 8 bits. The second stage 420 may comprise 9 rows of tri-state buffers (64 buffers in each row) that are arranged in a barrel shifter configuration. The shifter 400 may include a carry buffer array 440 configured to rotate blocks of lower bits from a copy register into higher bit positions in the second stage 420 of the shifter. First and second decoders (not shown) and a shift adder (not shown) may be included to provide shift input signals to the shift inputs of the first and second stages, as depicted in FIG. 2.

Figure 5:
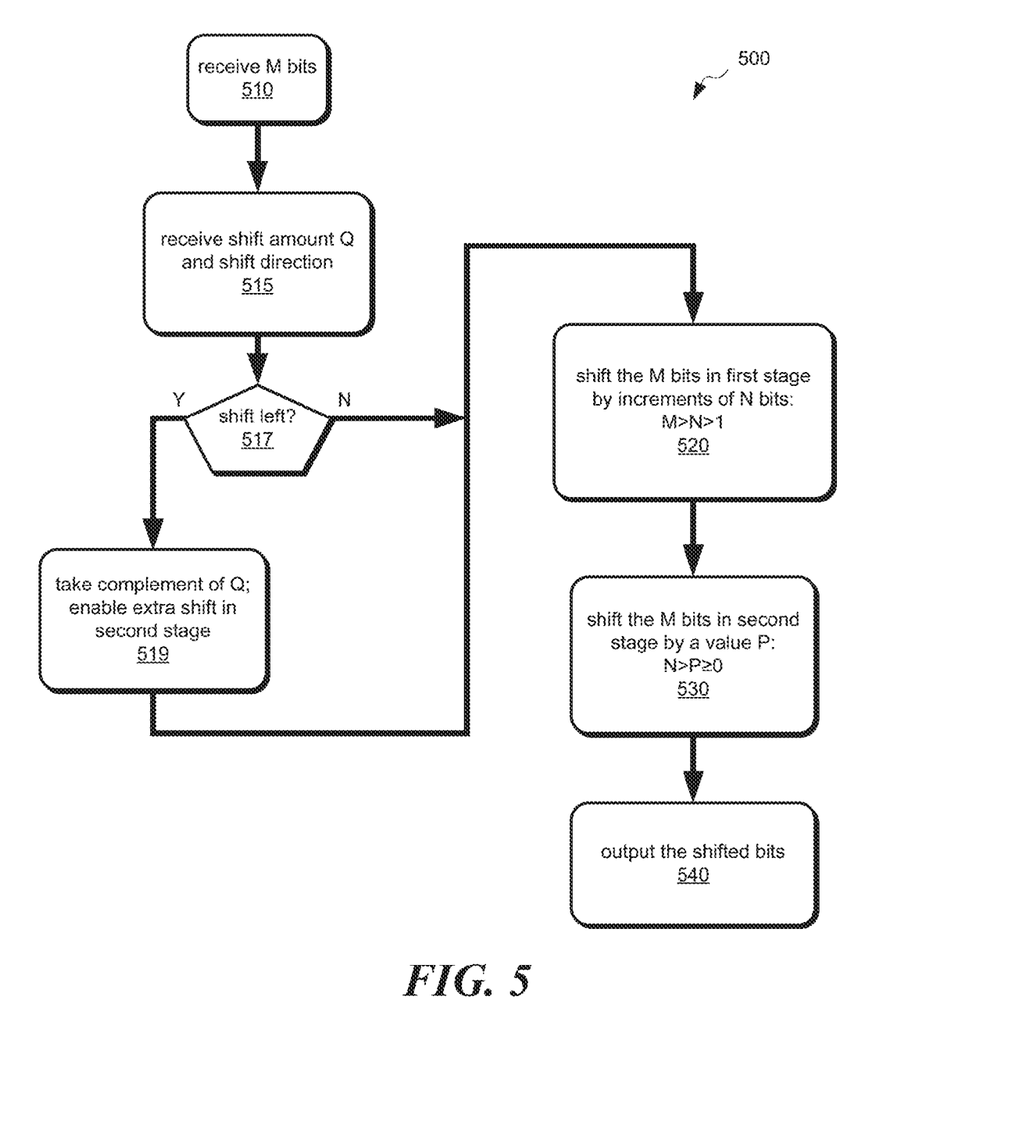
FIG. 5 depicts a method for shifting bits in a two-stage, bit shifter, according to some embodiments.

Also contemplated are methods for shifting bits with a two-stage bit shifter. One example of a method 500 for shifting bits is depicted in FIG. 5. According to some embodiments, a method 500 may comprise receiving 510 M bits at an input to a two-stage shifter 200. A shift amount and shift direction may be received 515 by the shifter. A method may comprise determining 517 whether a left-shift operation or a right-shift operation is selected.

If it is determined that a left-shift operation is selected, a method 500 may comprise inverting or taking a ones complement of the received shift amount and adding an extra single-bit shift to the result. The added shift may be implemented in a second stage of the bit shifter.

A method 500 for shifting bits may further comprise shifting 520 the received M bits by increments of N in a first stage of the bit shifter where M>N>1. N may be an amount divisible into M with no remainder. The shift increments may be values of 0, N, 2N, 3N, . . . M-N in the first stage. A method may include decoding a shift amount at the first stage and applying shift signals to the first stage in accordance with the shift amount and shift direction. A method 500 may further include shifting 530 the shifted M bits received from the first stage by a value P in the second stage of the shifter, where N≥P≥0. A method may include decoding a shift amount at the second stage and applying shift signals to the second stage in accordance with the shift amount and shift direction. For a left shift, an additional bit shift may be added at the second stage. In various embodiments, a method 500 may include providing lower bits from a copy register to the second stage, wherein the copy register is configured to hold a copy of the M bits received at the first stage of the shifter. The shifted bits may then be output 540 from the shifter 200.

The embodiments described above depict a two-stage M-bit shifter for which coarse shifting (in increments of N bits) is implemented in a first stage and fine shifting (by a value P) is implemented in a second stage. In some embodiments, fine shifting may be implemented in a first stage of the shifter, and coarse shifting may be implemented in a second stage of the shifter.

Some embodiments may use pre-shift circuitry at an input to the first stage of a two-stage shifter, and not employ a shift adder at the second stage of the shifter.

The technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Additionally, a method may include more acts than those illustrated, in some embodiments, and fewer acts than those illustrated in other embodiments.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A digital M-bit shifter circuit comprising:
a first stage comprising a first array of digital buffers configured to shift the M bits by increments of N, where N>1,
wherein the digital buffers of the first array are arranged in a plurality of rows,
wherein a first row of the plurality of rows comprises M digital buffers that share a first enabling input line, each of the M digital buffers of the first row having a single data input line receiving one of the M bits as input, each of the M digital buffers of the first row having a respective output line and being configured to pass its respective input bit to its respective output line only when the first enabling input is asserted; and
a second stage comprising digital buffers configured to further shift the M shifted bits from the first stage by an amount less than or equal to N.

2. The M-bit shifter circuit of claim 1, wherein the first array is an array of tri-state buffers.

3. The M-bit shifter circuit of claim 2, wherein the tri-state buffers of the first array are arranged in a plurality of groups, where M tri-state buffers in each group share a common enabling input line.

4. The M-bit shifter circuit of claim 2, wherein the plurality of rows of the first array is a number of rows equaling M÷N.

5. The M-bit shifter circuit of claim 1, wherein the second stage comprises a second array of tri-state buffers configured to receive at least M bits from the first stage.

6. The M-bit shifter circuit of claim 5, wherein the tri-state buffers of the second array are arranged in at least N rows of M tri-state buffers, where tri-state buffers in each row share a common enabling input line.

7. The M-bit shifter circuit of claim 1, further comprising a carry buffer array of tri-state buffers, wherein the carry buffer array is configured to provide lower bits of an input bit sequence to the second stage of the M-bit shifter.

8. The M-bit shifter circuit of claim 7, wherein data inputs to the carry buffer array connect to a copy register that is configured to hold a copy of M-bits provided to the shifter.

9. The M-bit shifter circuit of claim 7, wherein the tri-state buffers of the carry buffer array comprises at least one group of tri-state buffers having their enabling inputs connected in common with enabling inputs of a group of tri-state buffers in the first stage.

10. The M-bit shifter circuit of claim 1, further comprising:
a first decoder configured to receive a first shift amount and apply a first sequence of shift values to the first stage; and
a second decoder configured to receive a second shift amount and apply a second sequence of shift values to the second stage.

11. The M-bit shifter circuit of claim 10, further comprising a shift adder configured to add an additional bit shift to a shift amount for the second stage.

12. The M-bit shifter circuit of claim 11, wherein the shift adder is connected between the second decoder and shift inputs of the second stage.

13. The M-bit shifter circuit of claim 11, wherein the shift adder comprises a plurality of digital multiplexors.

14. The M-bit shifter circuit of claim 1, further comprising at least one input configured to receive a value representative of a shift direction that indicates a right-shift operation or a left-shift operation.

15. The M-bit shifter circuit of claim 1 arranged in an integrated circuit as part of an integrated processor.

16. The M-bit shifter circuit of claim 1,
wherein a second row of the plurality of rows of the first array comprises M digital buffers that share a second enabling input line, each of the M digital buffers of the second row having a respective data input line and having a respective output line connected to the output line of one of the M digital buffers of the first row, such that each connected output line and the digital buffers of the first and second rows that are connected to that output line define a column in the first array,
wherein the data input line of a first digital buffer in the first row is connected to the data input line of the digital buffer in the second row that is N columns removed from the first digital buffer in the first row,
wherein each of the M digital buffers of the second row is configured to pass an input bit from its respective data input line to its respective output line only when the second enabling input is asserted, the circuit being configured such that if the first enabling input is asserted, the second enabling input is not asserted.

17. The M-bit shifter circuit of claim 1, wherein N is divisible into M with no remainder.

18. A method for shifting bits in a digital processor, the method comprising:
receiving M bits at a first stage of a shifter, the first stage comprising a first array of digital buffers arranged in a plurality of rows, wherein a first row of the plurality of rows comprises M digital buffers that share a first enabling input line, each of the M digital buffers of the first row having a single data input line receiving one of the M bits as input, each of the M digital buffers of the first row having a respective output line and being configured to pass its respective input bit to its respective output line only when the first enabling input is asserted;
shifting the M bits in the first stage of the shifter by increments of N bits where N>1;
receiving the shifted M bits at a second stage of the shifter; and
shifting the received shifted M bits in the second stage of the shifter by a value P, where N≥P≥0.

19. The method of claim 18, further comprising:
receiving a signal representative of a shift amount;
receiving a signal representative of a shift direction; and
inverting or taking a ones compliment of the shift amount if the shift direction indicates a left-shift.

20. The method of claim 19, further comprising:
decoding at least a first portion of the received shift amount; and
applying a sequence of shift signals representative of the decoded first portion to the first stage.

21. The method of claim 20, further comprising:
decoding a second portion of the received shift amount; and
applying a sequence of shift signals representative of the decoded second portion to a shift adder; and applying output signals from the shift adder to the second stage.

22. The method of claim 18, further comprising providing lower bits from a copy register to the second stage, wherein the copy register is configured to hold a copy of the M bits received at the first stage of the shifter.

23. The method of claim 18, wherein N is divisible into M with no remainder.

* * * * *